US009382963B2

(12) United States Patent
Agarwal et al.

(10) Patent No.: US 9,382,963 B2
(45) Date of Patent: Jul. 5, 2016

(54) RUBBER ARTICLES SUBJECTED TO REPEATED DEFORMATION AND COMPOSITIONS FOR MAKING THE SAME

(71) Applicant: FIRESTONE INDUSTRIAL PRODUCTS COMPANY, LLC, Indianapolis, IN (US)

(72) Inventors: Sheel Agarwal, Stow, OH (US); Steven Luo, Copley, OH (US); John Rensel, Tallmadge, OH (US)

(73) Assignee: FIRESTONE INDUSTRIAL PRODUCTS COMPANY, LLC, Indianapolis, IN (US)

( * ) Notice: Subject to any disclaimer, the term of this patent is extended or adjusted under 35 U.S.C. 154(b) by 0 days.

(21) Appl. No.: 14/633,681

(22) Filed: Feb. 27, 2015

(65) Prior Publication Data
US 2015/0167771 A1 Jun. 18, 2015

Related U.S. Application Data

(63) Continuation of application No. 13/058,964, filed as application No. PCT/US2009/053857 on Aug. 14, 2009, now abandoned.

(60) Provisional application No. 61/088,827, filed on Aug. 14, 2008.

(51) Int. Cl.
*F16F 9/04* (2006.01)
*B32B 25/04* (2006.01)
(Continued)

(52) U.S. Cl.
CPC .............. *F16F 9/0409* (2013.01); *B32B 25/02* (2013.01); *B32B 25/04* (2013.01); *B32B 25/16* (2013.01);
(Continued)

(58) Field of Classification Search
CPC ........ B32B 25/04; B32B 25/16; B32B 25/02; B32B 2605/00; C08L 00/00; C08L 9/00; C08L 11/00; C08L 91/02; F16F 9/04; F16F 9/05; F16F 9/0409; F16F 2226/04; F16F 2224/025; B60G 11/27; B60G 2206/81; B60G 2202/152
USPC ............. 267/122, 64.19, 64.21, 64.23, 64.24, 267/64.27; 525/215, 235, 236
See application file for complete search history.

(56) References Cited

U.S. PATENT DOCUMENTS

| 4,671,996 A | 6/1987 | Cantor |
| 5,427,831 A | 6/1995 | Stevens |

(Continued)

FOREIGN PATENT DOCUMENTS

| EP | 1 484 525 A | 12/2004 |
| EP | 1 524 293 A | 4/2005 |

(Continued)

OTHER PUBLICATIONS

International Search Report for International Appl. Serial No. PCT/US2009/053857 dated Oct. 14, 2009, pp. 1-3.
(Continued)

*Primary Examiner* — Thomas J Williams
*Assistant Examiner* — Mariano Sy
(74) *Attorney, Agent, or Firm* — Thomas R. Kingsbury; Arthur M. Reginelli; Tama L. Drenski

(57) ABSTRACT

An air spring having an airsleeve, wherein at least one layer of said airsleeve includes the vulcanization product of an elastomer and syndiotactic 1,2-polybutadiene.

13 Claims, 3 Drawing Sheets

(51) Int. Cl.

| | | |
|---|---|---|
| *B32B 25/16* | (2006.01) | |
| *C08L 9/00* | (2006.01) | |
| *C08L 11/00* | (2006.01) | |
| *B60G 11/27* | (2006.01) | |
| *F16F 9/05* | (2006.01) | |
| *B32B 25/02* | (2006.01) | |
| *C08L 91/02* | (2006.01) | |

(52) U.S. Cl.
CPC . *B60G 11/27* (2013.01); *C08L 9/00* (2013.01); *C08L 11/00* (2013.01); *F16F 9/04* (2013.01); *F16F 9/05* (2013.01); *B32B 2264/102* (2013.01); *B32B 2264/107* (2013.01); *B32B 2264/108* (2013.01); *B32B 2307/102* (2013.01); *B32B 2307/704* (2013.01); *B32B 2307/72* (2013.01); *B32B 2605/00* (2013.01); *B60G 2202/152* (2013.01); *B60G 2206/81* (2013.01); *C08L 91/02* (2013.01); *F16F 2224/025* (2013.01); *F16F 2226/04* (2013.01)

(56) References Cited

U.S. PATENT DOCUMENTS

| | | | |
|---|---|---|---|
| 6,048,932 | A | 4/2000 | Okada et al. |
| 6,147,154 | A | 11/2000 | Fujii et al. |
| 6,197,888 | B1 | 3/2001 | Luo |
| 6,264,178 | B1 | 7/2001 | Schisler et al. |
| 6,291,591 | B1 | 9/2001 | Luo |
| 6,303,692 | B1 | 10/2001 | Luo |
| 6,331,594 | B2 | 12/2001 | Luo |
| 6,528,588 | B2 | 3/2003 | Luo |
| 6,620,760 | B2 | 9/2003 | Luo |
| 6,719,279 | B1 | 4/2004 | Koch et al. |
| 6,720,397 | B2 | 4/2004 | Luo |
| 6,786,476 | B1 | 9/2004 | Kerstetter, III et al. |
| 6,807,994 | B2 | 10/2004 | Westermann et al. |
| 7,153,908 | B2 | 12/2006 | Park |
| 7,196,129 | B2 | 3/2007 | Migliarini et al. |
| 7,250,203 | B2 | 7/2007 | Kerstetter, III et al. |
| 7,261,929 | B2 | 8/2007 | Allen et al. |
| 7,926,794 | B2 | 4/2011 | Thurow et al. |
| 8,067,503 | B2 | 11/2011 | Rademacher et al. |
| 8,207,270 | B2 | 6/2012 | Kerstetter, III et al. |
| 2004/0014869 | A1 | 1/2004 | Wong et al. |
| 2006/0068202 | A1 | 3/2006 | Aoyama et al. |
| 2006/0131797 | A1 | 6/2006 | Kerstetter, III |
| 2008/0111288 | A1 | 5/2008 | Howard et al. |

FOREIGN PATENT DOCUMENTS

| | | |
|---|---|---|
| EP | 1 674 758 A | 6/2006 |
| JP | 550259535 A | 3/1980 |
| JP | 5295175 A | 11/1993 |

OTHER PUBLICATIONS

Written Opinion for International Appl. Serial No. PCT/US2007/053857 dated Feb. 15, 2011, pp. 1-6.

RUBBER ARTICLES SUBJECTED TO REPEATED DEFORMATION AND COMPOSITIONS FOR MAKING THE SAME

This application is a continuation application of U.S. Non-Provisional application Ser. No. 13/058,964, which was the National Stage of International Application Serial No. PCT/US09/53857, filed on Aug. 14, 2009, which claims the benefit of U.S. Provisional Application Ser. No. 61/088,827, filed on Aug. 14, 2008, all of which are incorporated herein by reference.

TECHNICAL FIELD

Embodiments of the present invention relate to vehicle air springs and elastomeric compositions for making the same.

BACKGROUND

Air springs, or pneumatic suspension devices, have long been used to isolate road disturbances from a vehicle, seat, or cab. An air spring, as part of a vehicle's suspension, supports the vehicle's load or mass at each axle. Typically, each axle of a vehicle associated with an air spring supports the mass component or load carried by the axle. In addition, there may be ancillary air springs that support driver comfort in and around the driver's compartment, or cab. In an air spring, a volume of gas, usually air, is confined within a flexible container. As an air spring is compressed (jounce travel), the pressure of the gas within the air spring increases; and as an air spring extends (rebound travel), the pressure of the gas within the air spring decreases. Road disturbances are mainly absorbed by this compression and extension of the air springs as a function of work (w=∫F·dx). Air springs are often engineered to have a specific spring rate or spring constant, thereby controlling jounce and rebound characteristics for the desired application and for comfort.

Because an air spring may undergo countless cycles between compression and extension, the air spring must include an enclosure container for the gas that is flexible and durable. Typically, these enclosures are referred to as bellows or airsleeves and are made of cord-reinforced rubber compositions. The reinforcement in cord-reinforced rubber compositions may be fabric or metal, and cord-fabric may be, but is not limited to, natural or synthetic materials.

Over time and under operational stresses, the material properties of an airsleeve will change. Eventually, cracks may form and become sufficiently large so that the integrity of the airsleeve is challenged, requiring replacement. Thus, there is a need in the market for an air spring with an airsleeve having improved resistance to cracking.

SUMMARY OF THE INVENTION

In one or more embodiments, the present invention provides an air spring having an airsleeve, wherein at least one layer of said airsleeve includes the vulcanization product of an elastomer and syndiotactic 1,2-polybutadiene.

In one or more embodiments, the present invention provides a method for the production of an air spring airsleeve comprising mixing an elastomer, syndiotactic 1,2-polybutadiene, and a curative in a masterbatch to form a rubber composition, forming the rubber composition into the shape of an airsleeve, and curing the rubber composition.

In one or more embodiments, the present invention provides an air spring having an airsleeve, wherein at least one layer of said airsleeve has a rubber component comprising an elastomer and syndiotactic 1,2-polybutadiene.

DETAILED DESCRIPTION OF ILLUSTRATIVE EMBODIMENTS

Figure 1:
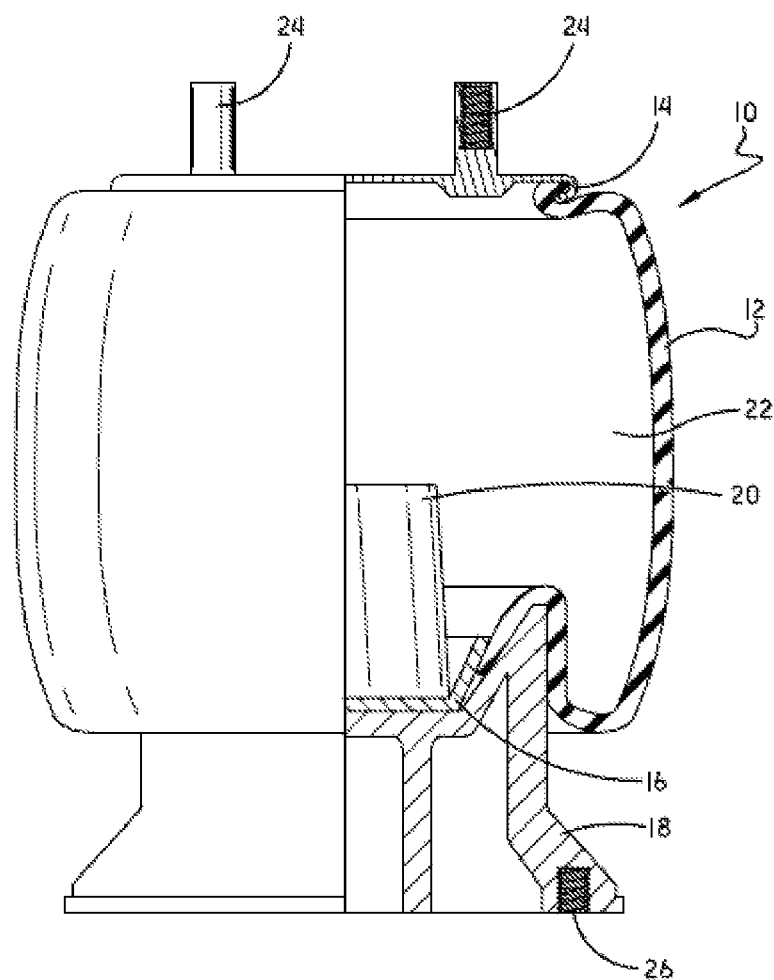
FIG. 1 is a perspective view of an exemplary air spring according to one or more embodiments of the present invention.
Figure 2:
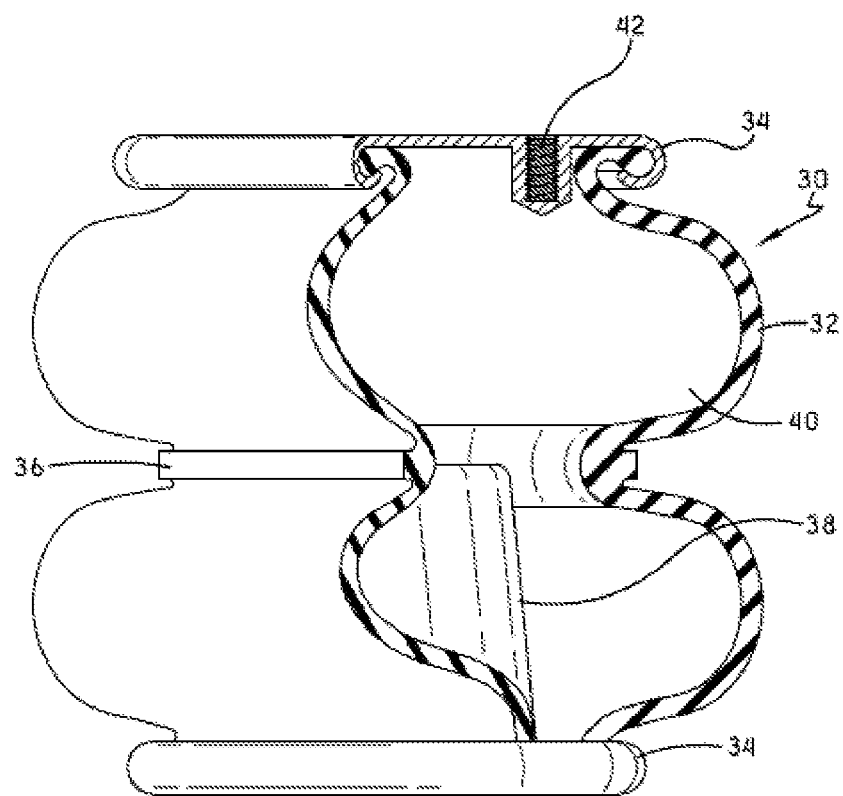
FIG. 2 is a perspective view of an exemplary air spring according to one or more embodiments of the present invention.

FIGS. 1 and 2 show two typical designs of air springs. In FIG. 1, a reversible sleeve air spring assembly is designated generally by the numeral 10. Reversible sleeve air spring assembly 10 includes flexible airsleeve 12. Bead plate 14 is crimped to airsleeve 12 to form an airtight seal between bead plate 14 and airsleeve 12. Similarly, end closure 16 is molded to flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for flexible airsleeve 12 to roll on during compressive (jounce) travel. Reversible air spring assembly 10 may optionally include bumper 20 to support the vehicle when there is no air in the air springs or during extreme road disturbances. Enclosed within airsleeve 12 is a volume of gas 22. Studs 24 and hole 26 are used to secure the reversible air spring assembly 10 to the mounting surface of an automobile (not shown).

FIG. 2 shows a (double) convoluted air spring assembly designated generally by the numeral 30. Convoluted air spring assembly 30 includes flexible airsleeve 32. Bead plates 34 are crimped to airsleeve 32 to form an airtight seal between bead plates 34 and airsleeve 32. A girdle hoop 36 is affixed to airsleeve 32 between bead plates 34. Convoluted air spring assembly 30 may optionally include bumper 38 to support the vehicle when there is no air in the air springs or during extreme road disturbances. Enclosed within airsleeve 32 is a volume of gas 40. Blind nuts, including 42 and other blind nuts not shown, are used to secure the convoluted air spring assembly 30 to the mounting surface of an automobile (not shown).

Figure 3:
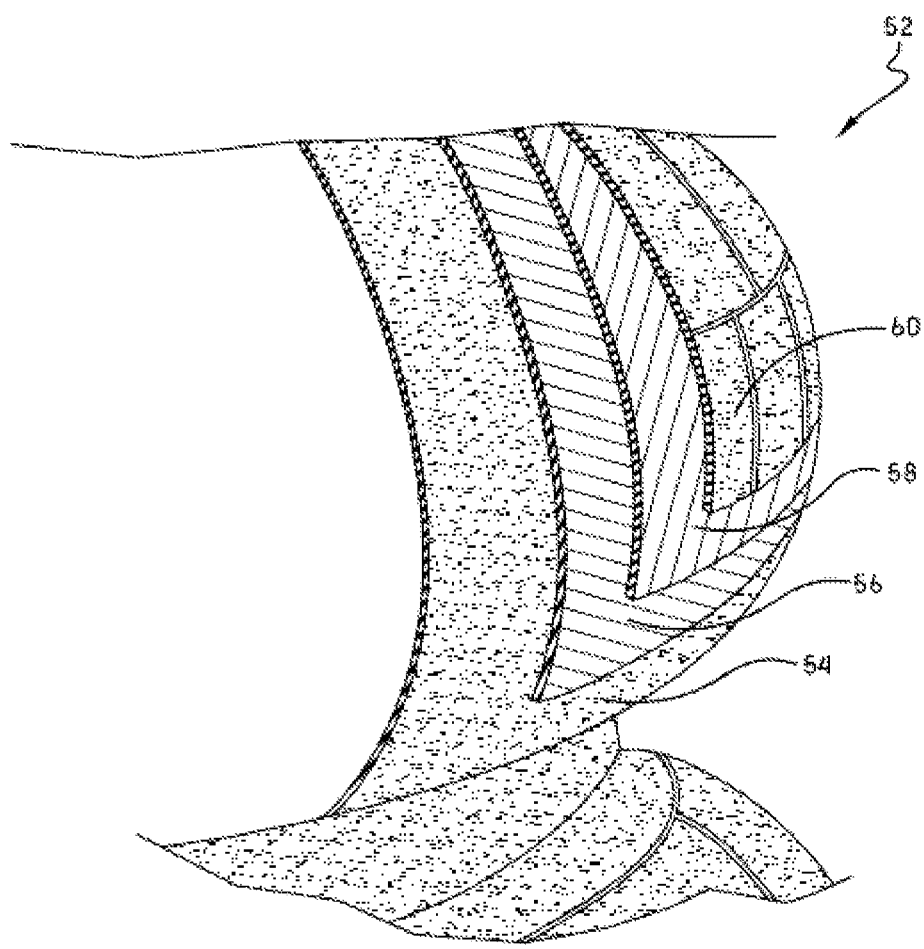
FIG. 3 is a cutaway view of an exemplary airsleeve showing its layered construction.

For both air spring assemblies 10 and 30, airsleeves 12 and 32 are made of cord-reinforced rubber and may be comprised of several layers, as shown in a cutaway view of an exemplary airsleeve 52 in FIG. 3. The reinforcement in cord-reinforced rubber compositions may be fabric or metal, and cord-fabric may be, but is not limited to, natural or synthetic materials. Exemplary airsleeve 52 features "two-ply" construction and includes four layers including: innerliner 54, first ply 56, second ply 58, and outer cover 60. Innerliner 54 and outer cover 60 may include calendered rubber. First ply 56 includes a single ply of cord-reinforced rubber with the cords at a specific bias angle. Second ply 58 includes a single ply of fabric-reinforced rubber with the same bias angle laid opposite that of first ply 56.

While the present invention is described in the context of an airsleeve and an air spring used in the suspension of an automobile, one of skill in the art will appreciate that the teachings disclosed are general and the present invention may be applied to other art relating to the air spring areas. The other areas might include, for example, air springs for seats, air springs used to support truck cabs, air springs used with buses, and the like.

One or more embodiments of the present invention are directed toward rubber compositions, which may also be referred to as vulcanizable compositions, that are useful in the manufacture of one or more layers of an air spring airsleeve. These vulcanizable compositions include a vulcanizable elastomer, syndiotactic 1,2-polybutadiene, and optionally other ingredients known to be included in rubber compositions for preparing one or more layers of an airsleeve. These rubber compositions may be fabricated and cured into airsleeves and ultimately assembled into air springs by employing techniques known in the art.

In one or more embodiments, vulcanizable elastomer, which may also be referred to as rubber, includes those polymers that are capable of being cured (also referred to as vulcanized) to form elastomeric compositions of matter.

As those skilled in the art appreciate, exemplary elastomers include natural rubber, synthetic polyisoprene, polybutadiene, polyisobutylene-co-isoprene, polychloroprene, poly (ethylene-co-propylene), poly(styrene-co-butadiene), poly (styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof.

In particular embodiments, the rubber includes polymers that derive from the polymerization of halogenated dienes and optionally monomer copolymerizable therewith. A popular halogenated diene is 2-chloro-1,3-butadiene, which is also known as chloroprene. Monomer copolymerizable with chloroprene includes sulfur and 2,3-dichloro-1,3-butadiene. Homopolymers of chloroprene are generally referred to as polychloroprene. For purposes of this description, the rubbers deriving from the copolymerization of chloroprene and monomer copolymerizable therewith may be referred to as polychloroprene copolymers.

In one or more embodiments, polychloroprene or polychloroprene copolymers employed in the practice of this invention may be characterized by a Mooney viscosity ($ML_{1+4}$ at 100° C.) of at least 25, in other embodiments at least 40, in other embodiments at least 60, in other embodiments at least 80, and in other embodiments at least 100. In these or other embodiments, the polychloroprene or polychloroprene copolymers may be characterized by a Mooney viscosity ($ML_{1+4}$ at 100° C.) of less than 150, in other embodiments less than 130, in other embodiments less than 110 in other embodiments less than 80, in other embodiments less than 60, and in other embodiments less than 50. In particular embodiments, the polychloroprene or polychloroprene copolymers may be characterized by a Mooney viscosity ($ML_{1+4}$ at 100° C.) of from about 100 to about 120, and in other embodiments from about 41 to about 51.

In one or more embodiments, blends of distinct polychloroprene or polychloroprene copolymers may be employed to achieve a desirable balance of properties. These distinctions may be based upon comonomer content and/or viscosity of the polymers.

Particularly useful examples of desirable polychloroprene or polychloroprene copolymers are available from DuPont Performance Elastomers (Wilmington, Del.) under the Neoprene™ "WD" and "WRT" family designations. It is believed that Neoprene™ WD and WRT are relatively crystallization-resistant, versus Neoprene™ G-type, and are copolymers of chloroprene and 2,3-dichloro-1,3-butadiene. Neoprene™ WD exhibits a Mooney Viscosity range ($ML_{1+4}$ at 100° C.) of 100-120, while Neoprene™ WRT exhibits a Mooney Viscosity range ($ML_{1+4}$ at 100° C.) of 41-51.

Syndiotactic 1,2-polybutadiene, which may be referred to simply as syndiotactic polybutadiene, includes crystalline thermoplastic diene resin that has a stereoregular structure in which the side-chain vinyl groups are located alternately on the opposite sides in relation to the polymeric main chain. In one or more embodiments, the syndiotactic 1,2-polybutadiene is a homopolymer of 1,3-butadiene monomer.

In one or more embodiments, the syndiotactic polybutadiene may be characterized by a weight-average molecular weight of at least 80 kg/mol, in other embodiments at least 90 kg/mol, and in other embodiments at least 100 kg/mol. In these or other embodiments, the syndiotactic polybutadiene may be characterized by a weight-average molecular weight of less than 250 kg/mol, in other embodiments less than 220 kg/mol, and in other embodiments less than 200 kg/mol. In one or more embodiments, the weight-average molecular weight of the syndiotactic polybutadiene can be determined by using a gel-permeation chromatography (GPC) with polystyrene standards.

In these or other embodiments, the syndiotactic polybutadiene may be characterized by a number-average molecular weight of at least 60 kg/mol, in other embodiments at least 70 kg/mol, and in other embodiments at least 80 kg/mol. In these or other embodiments, the syndiotactic polybutadiene may be characterized by a number-average molecular weight of less than 200 kg/mol, in other embodiments less than 180 kg/mol, and in other embodiments less than 160 kg/mol. In one or more embodiments, the number-average molecular weight of the syndiotactic polybutadiene can be determined by using a GPC with polystyrene standards.

In one or more embodiments, the syndiotactic polybutadiene may be characterized by a melt temperature (Tm) of at least 60° C., in other embodiments at least 70° C., and in other embodiments at least 90° C. In these or other embodiments, the syndiotactic polybutadiene may be characterized by a melt temperature of less than 130° C., in other embodiments less than 120° C., and in other embodiments less than 110° C. In one or more embodiments, the syndiotactic polybutadiene may be characterized by a glass transition temperature (Tg) of at least −40° C., in other embodiments at least −20° C., and in other embodiments at least 0° C. In one or more embodiments, these temperatures (Tm and Tg) can be determined according to ASTM D3418.

In one or more embodiments, the syndiotactic polybutadiene is characterized by a 1,2-linkage content (also referred to as vinyl content) of at least 70%, in other embodiments at least 80%, in other embodiments at least 85%, in other embodiments at least 90%, in other embodiments at least 95%, and in other embodiments at least 98%.

In one or more embodiments, the syndiotactic polybutadiene is characterized by a syndiotacticity of at least 60%, in other embodiments at least 70%, in other embodiments at least 80%, in other embodiments at least 90%, in other embodiments at least 95%, and in other embodiments at least 98%.

In one or more embodiments, the syndiotactic polybutadiene is characterized by a density of at least 750 kg/m³, in other embodiments at least 800 kg/m3, in other embodiments at least 850 kg/m³, and in other embodiments at least 900 kg/m³. In these or other embodiments, the syndiotactic polybutadiene is characterized by a density of less than 1100 kg/m³, in other embodiments of less than 980 kg/m³, in other embodiments of less than 950 kg/m³, and in other embodiments of less than 910 kg/m$^3$. In one or more embodiments, the density of the syndiotactic polybutadiene can be determined according to ASTM D1505.

In one or more embodiments, the syndiotactic polybutadiene may be characterized by a crystallinity of at least 5%, in other embodiments at least 10%, and in other embodiments at least 15%. In these or other embodiments, the syndiotactic polybutadiene can be characterized by a crystallinity of less than 50%, in other embodiments less than 40%, and in other embodiments less than 30%.

Particularly useful varieties of syndiotactic polybutadiene are available from JSR Corporation (Japan) under the tradenames JSR RB810, JSR RB820, JSR RB830, and JSR RB840.

In addition to the foregoing ingredients, the vulcanizable compositions of this invention may also optionally include other additives including, but not limited to, factice, carbon black, silica, stearic acid, metal oxides, antioxidants, polyethylene wax, wax, plasticizers, or other desirable ingredients.

In one or more embodiments, the vulcanizable composition of this invention may include special factices having low oil swell, or vulcanized oils. These factices decrease compound nerve and may permit higher liquid plasticizer levels. Factices may also speed the incorporation of fillers and increase milling efficiency. A suitable factice is commercially available from Akrochem Corporation (Akron, Ohio) under the Akrofax tradename.

In one or more embodiments, the vulcanizable composition of this invention may include carbon black. Carbon black is virtually pure elemental carbon in the form of colloidal particles that are produced by incomplete combustion or thermal decomposition of gaseous or liquid hydrocarbons under controlled conditions. Carbon black may be added to the vulcanizable composition as a reinforcing filler to achieve the required balance of processability, hardness and tensile or tear properties. Generally, any conventional carbon black, or blends of the same, used in compounding rubber-based airsleeve formulations is suitable for use in the present invention. Particularly useful carbon black varieties include those conforming to the characteristics of ASTM N550 and ASTM N762.

In one or more embodiments, the vulcanizable composition of this invention may include silica. Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms of silica are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 m$^2$/g, tapped density of 230 g/liter, pH (5% in water suspension) of 7, $SiO_2$ content of 98%, $Na_2SO_4$ content of 2%, and $Al_2O_3$ content of 0.2%.

In one or more embodiments, the vulcanizable composition of this invention may include stearic acid. Stearic acid (octadecanoic acid) is a waxy solid and has the chemical formula $C_{18}H_{36}O_2$. Stearic acid is particularly effective as a processing aid in minimizing mill and calendered roll sticking.

In one or more embodiments, the vulcanizable composition of this invention may include metal oxides, such as magnesium oxide (MgO) or zinc oxide (ZnO). The primary function of metal oxides in neoprene compositions is to neutralize trace hydrogen chloride that may be liberated by the polymer during processing, vulcanization, heat aging, or service. By removing the hydrogen chloride, metal oxides prevent auto-catalytic decomposition, resulting in greater stability. Metal oxides may also take part in the crosslinking process by speeding the rate of reaction of elemental sulfur with the unsaturation of the rubber.

In one or more embodiments, the vulcanizable composition of this invention may include antioxidants. A useful bisphenol type antioxidant is Vulkanox BKF, which does not discolor. Vulakanox BFK is commercially available from LANXESS (Leverkusen, Germany).

In one or more embodiments, the vulcanizable composition of this invention may include a low-viscosity polyethylene wax. Low-viscosity polyethylene wax is a release, or antisticking, agent. A useful low-viscosity polyethylene wax is available from Akrochem Corporation (Akron, Ohio) under the Akrowax PE-100 tradename.

In one or more embodiments, the vulcanizable composition of this invention may include wax. Wax is a processing aid and serves as a release agent.

In one or more embodiments, the vulcanizable composition of this invention may include a plasticizer. A useful plasticizer is DOS (dioctyl sebacate), available from Harwick Standard (Akron, Ohio) under the tradename Polycizer DOS.

In one or more embodiments, the vulcanizable composition of this invention may be prepared using a compatibilizer to improve the blending of the neoprene and the syndiotactic polybutadiene. An exemplary compatibilizer can be synthesized by reacting a low-molecular weight amine-functionalized polymer with low molecular weight neoprene or halogenated polymers.

In one or more embodiments, the vulcanizable composition of this invention includes a curative, or cure package. The cure package includes a sulfur-based compound and may also include other optional ingredients. Although one having skill in the art may appreciate other possible cure packages, an exemplary cure package includes sulfur, TMTM, and zinc oxide.

Sulfurs that are soluble or insoluble in elastomers may be used. An exemplary sulfur is Crystex OT 20, a polymeric sulfur that is insoluble in elastomers. At vulcanization temperatures, Crytex OT 20 de-polymerizes to soluble sulfur and behaves similarly to what is traditionally known as "rubber maker's sulfur" and fosters the crosslinking of polymer molecules. Crystex OT 20 is commercially available from Flexsys (Akron, Ohio).

TMTM, or tetramethylthiuram monosulfide is a cure accelerator that increases the rate of cure by catalyzing the addition of sulfur chains to the rubber molecules. TMTM is commercially available from Western Reserve Chemical Corporation (Stow, Ohio).

Zinc oxide acts as a cure activator in the presence of sulfur, one or more accelerators, and unsaturated rubber to help promote the formation of sulfur cross-links during the vulcanization process.

Antidegradant protect the final product vulcanizate against damaging external influences such as oxidation, ozone, heat, and dynamic stresses. A suitable antidegradant is Vulkanox MB2, also known as 4- and 5-methyl-2-mercaptobenzimidazole (MMBI) and is commercially available from LANXESS (Leverkusen, Germany).

Another suitable antidegradant is Wingstay 100, which is a mixed diaryl-p-phenylenediamine type antidegradant. Wingstay 100 is commercially available.

Another suitable antidegradant is IPPD, or N-isopropyl-N'-phenyl-p-phenylenediamine. IPPD is available through Flexsys (Akron, Ohio) under the tradename Santoflex IPPD.

Another suitable antidegradant is 6PPD, or N-(1,3-dimethylbutyl)-N'-phenyl-p-phenylenediamine. 6PPD is available through Flexsys (Akron, Ohio) under the tradename Santoflex 6PPD.

In one or more embodiments, the vulcanizable compositions employed in practicing the present invention include a sufficient amount of vulcanizable rubber so as to achieve a technologically useful airsleeve of an air spring. In one or more embodiments, the overall vulcanizable composition of matter include at least 35% by weight, in other embodiments at least 40% by weight, and in other embodiments at least 45% by weight of vulcanizable rubber. In one or more embodiments, at least 80%, in other embodiments at least 90%, and in other embodiments at least 95% of the rubber component of the vulcanizable composition comprises polychloroprene or polychloroprene copolymers.

In one or more embodiments, the vulcanizable composition of this invention includes at least about 5, in other embodiments at least about 8, and in other embodiments at least about 10 parts by weight (pbw) of syndiotactic polybutadiene per 100 parts by weight of rubber (e.g. total rubber). It will be understood that parts by weight of the component per 100 parts by weight of total rubber can be referred to as phr. In one or more embodiments, the vulcanizable compositions include less than about 50, in other embodiments less than about 30, in other embodiments less than about 20, and in other embodiments less than about 15 phr of syndiotactic polybutadiene.

In certain embodiments, the vulcanizable composition of this invention is devoid of factice. In one or more embodiments, the vulcanizable composition may include at least about 2, in other embodiments at least about 4, and in other embodiments at least about 8 phr of factice. In one or more embodiments, the vulcanizable composition may include less than about 20, in other embodiments less than about 15, and in other embodiments less than about 12 phr of factice.

In one or more embodiments, the vulcanizable composition may include at least about 20, in other embodiments at least about 30, and in other embodiments at least about 40 phr of carbon black. In one or more embodiments, the vulcanizable composition may include less than about 100, in other embodiments less than about 75, and in other embodiments less than about 50 phr of carbon black.

In one or more embodiments, the vulcanizable composition may include at least about 15, in other embodiments at least about 20, and in other embodiments at least about 25 phr of silica. In one or more embodiments the vulcanizable composition may include less than about 250, in other embodiments less than about 200, in other embodiments less than about 90, and in other embodiments less than about 80 phr of silica.

Those skilled in the art will be able to select an appropriate amount of the various ingredients that can be used based upon the ultimate desired properties sought within the airsleeve of an air spring. Likewise, those skilled in the art will be able to select an appropriate amount of curative and complementary cure agents in order to achieve a desired level of cure.

The rubber compositions for preparing one or more layers of airsleeve according to the present invention can be prepared by conventional means using conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers, fillers, processing oils, waxes, and other ingredients used. In one or more embodiments, the ingredients can be added together in a single stage. In other embodiments, some of the ingredients such as syndiotactic polybutadiene, carbon black, etc. can be first loaded followed by the rubber. In other embodiments, a more conventional manner can be employed where the rubber is added first followed by the other ingredients. In even other embodiments, the rubber may be added at the same time as the syndiotactic polybutadiene.

When utilizing an internal mixer, the dry or powdery materials such as the carbon black can be added first, followed by the processing aids and finally the neoprene (this type of mixing can be referred to as an upside-down mixing technique).

Mixing cycles generally range from about 2 to 10 minutes. In certain embodiments an incremental procedure can be used whereby the rubber and part of the ingredients are added first, and the remaining ingredients are added in additional increments. In other embodiments, part of the rubber can be added on top of the other ingredients. In other embodiments, the rubber and syndiotactic polybutadiene are added together. In one or more embodiments, two-stage mixing can be employed.

The syndiotactic polybutadiene can be added with the rubber near the beginning of the mixing cycle. In one or more embodiments, the syndiotactic polybutadiene is included before the cure package is added.

Because of the melting point of the syndiotactic polybutadiene, the masterbatch drop temperature may be set to about 100±10° C.

The cure package (sulfur, accelerators, activators, etc.) can be added near the end of the mixing cycle and at lower temperatures to prevent premature crosslinking of the neoprene chains.

Once mixed, the rubber composition can be then formed into a sheet via calendering or combined with a fabric or metal reinforcing cord. The rubber compositions of the invention can also be formed into various types of articles using other techniques such as extrusion.

In one or more embodiments, the rubber compositions of the present invention include discontinuous domains of syndiotactic polybutadiene in polychloroprene or polychloroprene copolymers. It is believed that these domains are formed because syndiotactic polybutadiene and polychloroprene or polychloroprene copolymers are immiscible. Despite this, the rubber compositions of the present invention have advantageous qualities. By selecting syndiotactic polybutadiene having the disclosed melting temperatures, the syndiotactic polybutadiene can be dispersed into the neoprene without employing high mixing temperatures that may cause scorching of the polychloroprene or polychloroprene copolymers.

The vulcanizable rubber compositions of the present invention can be formed into airsleeves of air springs by employing conventional techniques for fabricating and manufacturing air springs.

In order to demonstrate the practice of the present invention, the following examples have been prepared and tested. The examples should not, however, be viewed as limiting the scope of the invention. Accordingly, for an appreciation of the true scope and breadth of the invention, reference should be made to the following claims.

EXAMPLES

Two airsleeve rubber compositions were prepared according to the examples in Table I, and the parts of each ingredient are by weight, unless otherwise specified. The first rubber composition did not include syndiotactic polybutadiene. The second rubber composition included syndiotactic polybutadiene having a 1,2-linkage content of about 92%, a melt temperature of about 95° C., a density of about 906 kg/m³, a crystallinity of about 15-30% and a molecular weight of about 120 kg/mol. The Polychloroprene I and polychloroprene II were copolymers of chloroprene and 2,3-dichloro-1,3-butadiene. Polychloroprene I had a Mooney viscosity of about 100-120, and polychloroprene II had a Mooney viscosity of about 41-51.

TABLE I

| Rubber Compositions | 1 | 2 |
|---|---|---|
| Ingredients | | |
| Polychloroprene I | 50 | 45 |
| Polychloroprene II | 50 | 45 |
| Syndiotactic Polybutadiene | | 10 |
| Factice Browncake | 10 | 10 |
| N550 | 45 | 45 |
| Stearic Acid | 0.5 | 0.5 |
| Magnesium Oxide | 4 | 4 |
| Paraffin Wax | 2 | 2 |
| DOS | 20 | 20 |
| TOTAL | 181.5 | 181.5 |
| Crystex OT-20 | 1 | 1 |
| DOTG | 1 | 1 |
| TMTM | 1 | 1 |
| Zinc Oxide | 5 | 5 |
| Wingstay 100 (Diaryl PPD) | 1.5 | 1.5 |
| ODP | 2 | 2 |
| TOTAL | 193.0 | 193.0 |

The results of the various physical properties tested are reported in Table II.

TABLE II

| Rubber Compositions | 1 | 2 |
|---|---|---|
| Results | | |
| MDR2000 (153° C., Final) | | |
| ML (kg · cm) | 1.2 | 1.1 |
| MH (kg · cm) | 10.4 | 10.1 |
| Ts2 (min) | 7.7 | 6.0 |
| Ts5 (min) | 16.3 | 11.2 |
| Tc50 (min) | 14.6 | 10.0 |
| Tc90 (min) | 44.0 | 33.1 |
| Mooney (100° C., Final) | | |
| ML 1 + 4 (MU) @ 100° C. | 39.1 | 33.9 |
| Micro Dumbell Tensile (23° C., Final, Unaged) | | |
| Maximum Stress (MPa): | 17.3 | 13.8 |
| 50% Modulus (MPa): | 0.9 | 1.1 |
| 100% Modulus (MPa): | 1.8 | 2.4 |
| 200% Modulus (MPa): | 4.8 | 6.0 |
| 300% Modulus (MPa): | 8.3 | 10.0 |
| % Strain at Ultimate Break: | 663.9 | 456.3 |
| Toughness (MPa): | 59.4 | 32.5 |
| MICRO DUMBELL TENSILE (100° C., FINAL, UNAGED) | | |
| Maximum Stress (MPa): | 8.8 | 7.0 |
| 50% Modulus (MPa): | 0.8 | 0.8 |
| 100% Modulus (MPa): | 1.5 | 1.7 |
| 200% Modulus (MPa): | 3.7 | 4.2 |
| 300% Modulus (MPa): | 6.1 | 6.9 |
| % Strain at Ultimate Break: | 433.8 | 303.7 |
| Toughness (MPa): | 18.2 | 9.5 |

Various modifications and alterations that do not depart from the scope and spirit of this invention will become apparent to those skilled in the art. This invention is not to be duly limited to the illustrative embodiments set forth herein.

What is claimed is:

1. An air spring having an airsleeve, where at least one layer of said airsleeve includes a vulcanization product of a vulcanizable composition comprising:
   an elastomer, where said elastomer includes polychloroprene or a polychloroprene copolymer; and
   from about 10 to about 30 parts by weight syndiotactic 1,2-polybutadiene, per 100 parts by weight of total rubber, where said syndiotactic 1,2-polybutadiene has a melt temperature of from about 70° C. to about 95° C.

2. The air spring of claim 1, where said polychloroprene copolymer is a copolymer of chloroprene and 2,3-dichloro-1,3-butadiene.

3. The air spring of claim 2, where said copolymer has a Mooney Viscosity ($ML_{1+4}$ at 100° C.) of 100-120.

4. The air spring of claim 2, where said polychloroprene copolymer comprises a copolymer of chloroprene and 2,3-dichloro-1,3-butadiene having a Mooney Viscosity ($ML_{1+4}$ at 100° C.) of 41-51.

5. The air spring of claim 1, where said syndiotactic 1,2-polybutadiene is characterized by a 1,2-linkage content of at least 70%, and less than 90%.

6. The air spring of claim 1, where said syndiotactic 1,2-polybutadiene is characterized by syndiotacticity of at least 60%, and less than 90%.

7. An air spring having an airsleeve, where at least one layer of said airsleeve includes a vulcanization product of a vulcanizable composition comprising:
   an elastomer, where said elastomer includes polychloroprene or a polychloroprene copolymer; and
   from about 10 to about 30 parts by weight syndiotactic 1,2-polybutadiene, per 100 parts by weight of total rubber, the syndiotactic 1,2-polybutadiene having a melt temperature of about 95° C.

8. The air spring of claim 7, where said polychloroprene copolymer is a copolymer of chloroprene and 2,3-dichloro-1,3-butadiene.

9. The air spring of claim 7, where said elastomer includes a first copolymer of chloroprene and 2,3-dichloro-1,3-butadiene having a Mooney Viscosity ($ML_{1+4}$ at 100° C.) of 100-120.

10. The air spring of claim 9, where said elastomer further includes a second copolymer of chloroprene and 2,3-dichloro-1,3-butadiene having a Mooney Viscosity ($ML_{1+4}$ at 100° C.) of 41-51.

11. The air spring of claim 7, where said syndiotactic 1,2-polybutadiene is characterized by a 1,2-linkage content of at least 70%, and less than 90%.

12. The air spring of claim 7, where said syndiotactic 1,2-polybutadiene is characterized by syndiotacticity of at least 60%, and less than 90%.

13. A method for production of an air spring airsleeve comprising:
   mixing an elastomer, syndiotactic 1,2-polybutadiene, and a curative in a masterbatch to form a rubber composition, wherein said elastomer includes polychloroprene or a polychloroprene copolymer;
   forming the rubber composition into an airsleeve; and
   curing the rubber composition, where said syndiotactic 1,2-polybutadiene has a melt temperature of from about 70° C. to about 95° C., and where said rubber composition includes from about 10 to about 30 parts by weight syndiotactic 1,2-polybutadiene, per 100 parts by weight of total rubber.

\* \* \* \* \*